UNITED STATES PATENT OFFICE.

SYLVESTER LEWIS, OF ROCHESTER, NEW YORK.

IMPROVED MODE OF TREATING OILS AND FATS FOR RENDERING THEM MORE USEFUL FOR BURNING IN LAMPS, LUBRICATING MACHINERY, AND FOR OTHER PURPOSES.

Specification forming part of Letters Patent No. 35,527, dated June 10, 1862; Reissue No. 1,647, dated March 29, 1864.

*To all whom it may concern:*

Be it known that I, SYLVESTER LEWIS, of Rochester, in the county of Monroe and State of New York, have invented a new and useful Improvement in Treating Oils and Fats for Illuminating and Lubricating Purposes; and I do hereby declare that the following is a full, clear, and exact description thereof.

The object of my invention is the production of an improved quality of oil for either illuminating, lubricating, or other useful purposes; and it consists in the combination, in proper proportions, of any kind of unctuous oil or fat with the light oils from petroleum, known as "benzole," "benzine," "naphtha," or "carbon spirits," and the oil thus produced may be colored, and to a certain extent clarified, by the admixture of a certain proportion of annotto.

I take any kind of unctuous oil, fish-oil, or animal-fat—as lard or tallow—and mix with it about two parts (more or less) of benzole, benzine, or naphtha, previously prepared by distilling or deodorizing, to one part of oil or fat, stirring or agitating them in a suitable vessel until the mixture is perfect. The ingredients should be of a temperature of about 100° Fahrenheit when mixed; but after the mixture has been effected it may stand at a lower temperature—say 50° to 70°—while a separation of the solid and liquid portions takes place. After standing about twenty-four hours, when rendered lard or solid fat is used, the heavy or solid portions will be found deposited at the bottom of the vats, while the lighter portions remain at the top, and may be drawn off and separated from the other; but time and trouble may be saved by substituting lard or other oils for the solid fat, in which case the compound would require to stand but about six hours or less and need not be heated. The volatile portions of the benzole, benzine, or naphtha (whichever is used) are to a great extent absorbed by the oil or fat in the combination which takes place, so that the liquid which is first drawn off constitutes a valuable oil for burning in lamps, as it is deprived of its volatile or explosive properties, and burns with a clear, dense flame, having a far greater illuminating-power than that produced by petroleum, rock-oil, or its products. It can also be burned in common lamps similar to fluid-lamps, the only difference being that of a larger tube and no chimney is required. The denser portions of the fat constitute an excellent lubricator for machinery. A less quantity of benzole or naphtha in proportion to the oil or fat will produce a good effect; but the oil produced is heavy, and its unctuous quality is not sufficiently changed. The separation of the oleine from the stearine is in a measure effected by a less quantity of benzole or its equivalent; but the best effect is produced by combining it with the oil or fat in about the proportions given above.

A light amber color may be given to this compound, with perhaps also a clarifying effect, by the addition of a quantity of annotto previously prepared by dissolving it in a pure benzole or its equivalent, when the whole is again shaken or stirred until it is thoroughly intermixed. The proportion of the annotto should be about one-third of an ounce or less to a gallon of the compound.

The substance herein called "benzole" is not the product from gas-tar; but is the light product popularly known as "benzine," "naphtha," "carbon spirits," &c., derived from the distillation of petroleum.

What I claim as my invention, and desire to secure by Letters Patent, is—

The treatment of oils and fats by the use of benzole, benzine, or naphtha, either with or without annotto, combined substantially in the manner and for the purposes described.

SYLVESTER LEWIS.

Witnesses:

WM. S. LOUGHBOROUGH,

A. LENOSS.